3,134,650
LIQUID-LIQUID CONTACTING APPARATUS
Maurice Charles Tanner, Mirehouse, Whitehaven, and Leonard Lowes, Seascale, England, assignors to United Kingdom Atomic Energy Authority, London, England
Filed Jan. 9, 1958, Ser. No. 707,994
Claims priority, application Great Britain Jan. 10, 1957
3 Claims. (Cl. 23—267)

This invention relates to liquid-liquid contacting apparatus and in particular to mixer-settler apparatus for the contacting of toxic, radioactive or otherwise dangerous liquids.

In the contacting of such liquids mechanical mixing methods are undesirable as direct mechanical maintenance is not easily carried out.

The object of the present invention is to provide for effective mixing of liquid phases in the mixer compartments of a mixer-settler, an apparatus not employing moving mechanical parts in contact with the liquids.

According to the present invention a mixer-settler apparatus has means for mixing of liquid phases comprising a pair of mixer tubes dipping into each mixer compartment and means for increasing and decreasing the pressure in the mixer tubes in and out of phase interrelationship.

Figure 1:
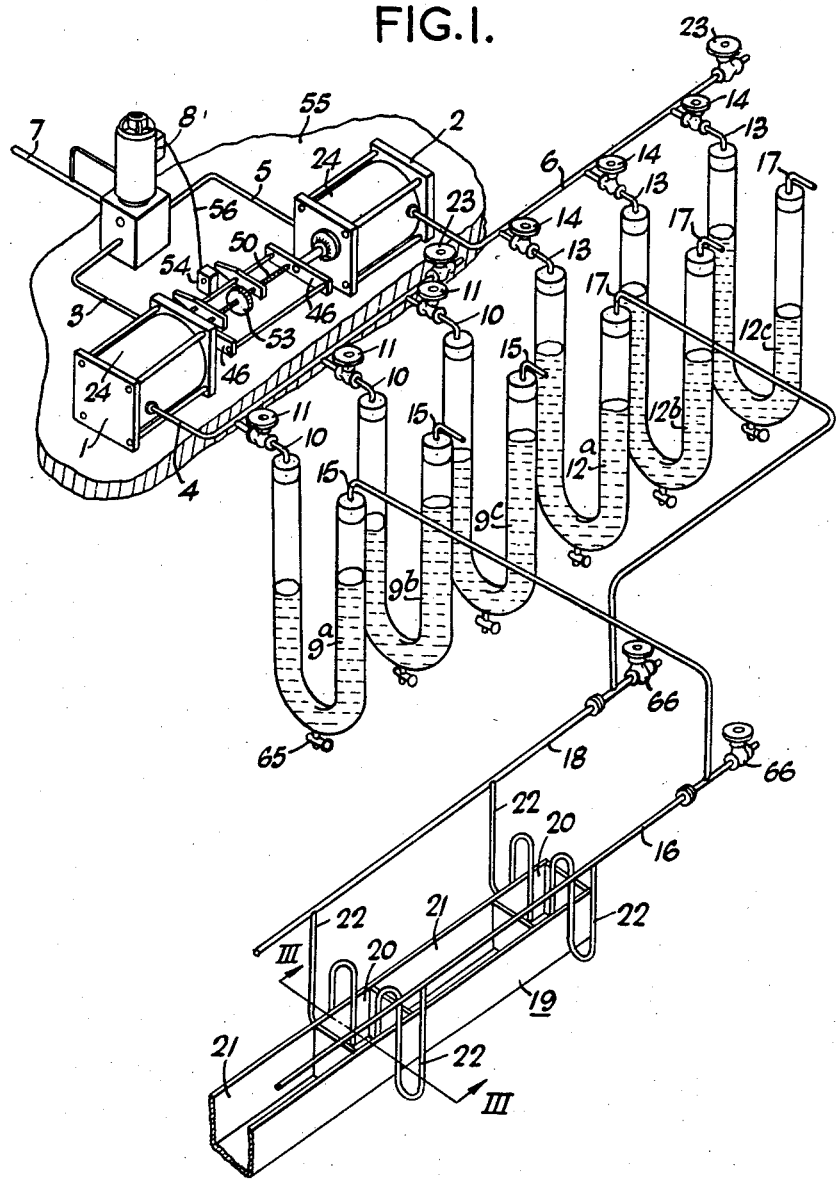
Figure 2:
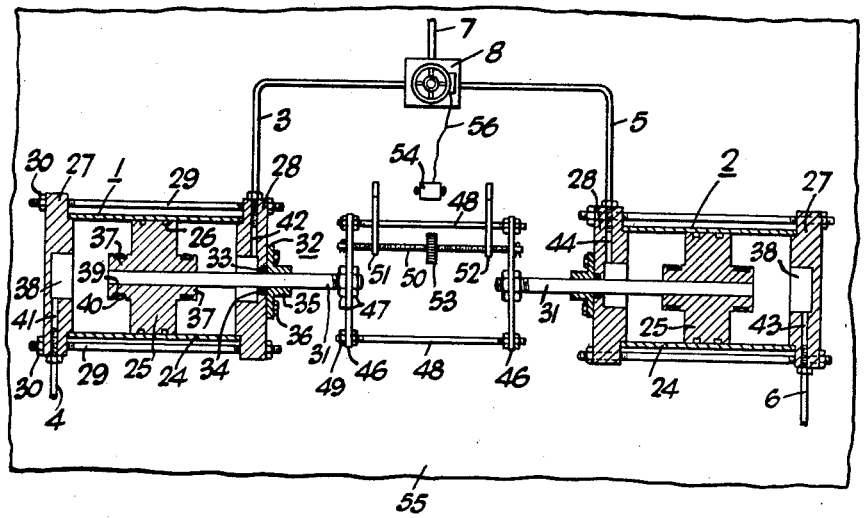
Figures 3, 4:
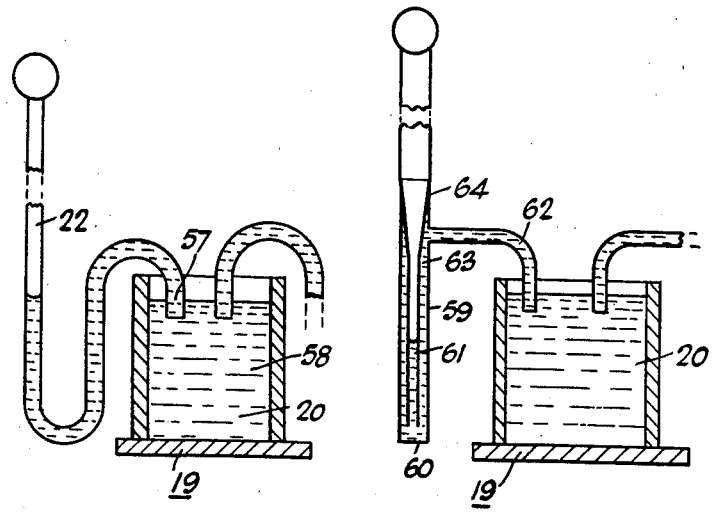

One apparatus in accordance with the invention will now be described with reference to the accompanying drawings in which:

FIG. 1 is a perspective view of the complete apparatus.
FIG. 2 is a sectional detail of part of FIG. 1.
FIG. 3 is a section on the line III—III of FIG. 1.
FIG. 4 shows an arrangement alternative to that illustrated in FIG. 3.

In FIG. 1 there is illustrated an associated pair of double-acting cylinders 1 and 2. The cylinder 1 has an inlet pipe 3 and an outlet pipe 4 functioning as a manifold and the cylinder 2 has an inlet pipe 5 and an outlet pipe 6 functioning as a manifold. The inlet pipes 3 and 5 connect with a compressed air supply pipe 7 through a solenoid actuated valve 8 which controls the supply of compressed air to the pipes 3 and 5. The outlet pipe 4 connects with a group of three U-tubes 9a, 9b, 9c through pipes 10 having adjustable air bleed valves 11, while the outlet pipe 6 connects with a further group of U-tubes 12a, 12b, 12c through pipes 13 having adjustable air bleed valves 14. Outlet pipes 15 from the U-tubes 9a, 9b, 9c connect with pulse tube manifolds 16 and outlet pipes 17 from the U-tubes 12a, 12b, 12c connect with pulse tube manifolds 18. (For the sake of clarity only that manifold 16 associated with the U-tube 9a and that manifold 18 associated with the U-tube 12a are shown in FIG. 1.) The outlet pipes 15 and 17 are provided with air bleed valves 66. The manifolds 16 and 18 are grouped in pairs, each pair being associated with a mixer settler 19 having alternate mixer compartments 20 and settler compartments 21. Pulse mix tubes 22 connecting with the manifold 16 and 18 dip into the mixer compartments 20. The outlet pipes 4 and 6 from the cylinders 1 and 2 have outlet air bleed valves 23 and the U-tubes have drain taps 65.

Referring to FIG. 2 the cylinders 1 and 2 are of similar construction and comprise a body 24 containing a double acting piston 25 sealed by rubber piston rings 26. The body 24 is held between square end covers 27 and 28 clamped by tie rods 29 and nuts 30. A piston rod 31 shrink fitted in the piston 25 passes through the end cover 28 and a gland 32 comprising a rubber sealing ring 33 held in a housing 34 in the end cover 28 and retained by a flanged guide tube 35 bolted to the end cover 28 by bolts 36. On each face of the piston 25 there is an integral secondary buffer piston 37 complementary to holes 38 in the end covers 27 and 28. The buffer pistons 37 have circumferential grooves 39 holding rubber sealing rings 40. The end cover 27 of the cylinder 1 has an outlet port 41 into which the outlet pipe 4 is screwed while the end cover 28 of the cylinder 1 has an inlet port 42 into which the inlet pipe 3 is screwed. The end cover 27 of the cylinder 2 has an outlet port 43 connecting with the outlet pipe 6 while the end cover 28 of the cylinder 2 has an inlet port 44 connecting with the inlet pipe 5.

The piston rods 31 carry transverse members 46 fixed by nuts 47. Longitudinal tie rods 48, fixed by nuts 49, connect the transverse members 46. A threaded rod 50 rotatably supported between the transverse members 46 carries twin switch operating arms 51 and 52. The switch arms 51 and 52 are slidable on one tie rod 48 and are movable along the threaded rod 50 by rotation of the rod 50 through a hand wheel 53. One-half of the rod 50 has a left hand thread while the other half has a right hand thread so that the switch operating arms 51 and 52 can either be moved away from or towards each other. A double acting press button switch 54 is mounted between the switch operating arms 51 and 52 on a base plate 55 which also supports the cylinders 1 and 2 and the solenoid actuated valve 8. The switch 54 is connected to the valve 8 by a lead 56 and controls the operation of the valve 8.

FIG. 3 shows in greater detail the pulse mix tube 22 of FIG. 1. This pulse mix tube 22 has a double bend so as to form a liquid plug to prevent "blowing in." The mouth 57 of the tube 22 dips below the surface of the liquid 58 in the mixer compartment 20 sufficient to prevent sucking in of surface air. An alternative form of pulse-mix tube is shown in FIG. 4 comprising a vertical tube 59 closed at the lower end 60, a partly tapered tube 61 internal to the tube 59 and coaxial with it, and a tube 62 having a right angle bend and connecting with the annular space 63 between the tubes 59 and 61. The tube 61 is sealed at its upper end 64 within the tube 59.

In use of the apparatus flow through of liquids in the mixer settler 19 is achieved conventionally, mixing of liquids in the mixer compartments 20 being effected in the following manner. Considering the solenoid actuated valve 8 to be so energised that compressed air from the supply pipe 7 is admitted to the inlet pipe 5 of the cylinder 2 and the inlet pipe 3 of the cylinder 1 is connected to exhaust. The inlet of air into the cylinder 2 causes the piston 25 in this cylinder to move forcing air into the outlet pipe 6. The piston 25 of the cylinder 1 moves with the piston 25 of the cylinder 2 by virtue of the linkage between the two pistons 25 and air is forced to exhaust along the pipe 3 while air is also drawn out of the pipe 4. As the pistons 25 reach the end of this stroke the switch arm 51 operates the switch 54 to change the energisation of the valve 8 so that the inlet pipe 5 is now connected to exhaust and the inlet pipe 3 is connected to the compressed air supply pipe 7. Thus a return stroke is made by the pistons 25 air being forced into the outlet pipe 4. Air is also forced to exhaust along the pipe 5 and air is drawn out from the pipe 6. When the end of the latter stroke is reached the switch arm 52 operates the switch 54 to change back the energisation of the solenoid actuated valve 8. Thus a continuous oscillation of the pistons 25 occurs. At the end of each stroke of the pistons 25 the entry of one of the buffer pistons 37 on each piston 25 into the corresponding hole 38 produces a "cushion" effect at the end of the stroke allowing high speed operation.

The U-tubes 9a, 9b, 9c, 12a, 12b, 12c are partly filled with water which prevents escape of radioactivity and provides a medium for the transmission of the air pressure varations in the manifolds 4 and 6 to the pulse tubes 22. Contaminated water is drained from the U-tubes 9a, 9b, 9c, 12a, 12b, 12c through the taps 65 which also provide for admittance of clean water to the tubes. The variation of the air pressure in the manifolds 4 and 6 causes oscillation of the water contained within the U-tubes, the oscillation of the water in the U-tubes, 9a, 9b, and 9c being 180° out of phase with that in the U-tubes 12a, 12b and 12c.

Considering the U-tubes 9a and 12a, the oscillation of the water in the U-tube 9a causes liquids which are to be mixed to be alternately drawn up into and expelled from the pulse mix tubes 22 connecting with the pulse tube manifold 16 while the oscillation of the water in the U-tube 12a causes liquid to be drawn up into and expelled from the pulse mix tubes 22 connecting with the pulse tube manifold 18. The two sets of pulse mix tubes 22 however work 180° out of phase which prevents oscillation of the liquid levels in the mixer compartments 20 which would occur if only a single pulse mix tube 22 were used in each mixer compartment 20. The pulsing causes mixing of light and heavy phases in the mixer compartments 20. Initially mixing occurs when light phase forming an upper layer in the mixer compartment 20 is first drawn into the pulse mix tubes 22 and then expelled into a lower layer of heavy phase thus forming coarse droplets of light phase in the heavy phase. The droplets of light phase rise and recoalesce with the bulk of the light phase entrapping as they do so small globules of the heavy phase. Repetition gives a fine dispersion of heavy phase in a continuous light phase medium. The amplitude of pulsing is controlled by the air bleed valves 11 and 14 which are regulated to control the amplitude of the oscillation of the water in the U-tubes. The frequency of pulsing (typically about 60 cycles per minute) is dependent on the degree of separation of the switch actuators 51 and 52, i.e. the nearer the actuators 51 and 50 are to each other the higher the stroke frequency of the pistons 25. The pulse mix tubes 22 shown in FIGS. 3 and 4 are designed to prevent blowing of air into the mixer compartments 20 which might occur with simple straight pulse mix tubes. Dissolution of the air in the pipes 15 and 17 in the water contained within the U-tubes 9a, 12a etc. could cause radioactive liquid to be drawn into the U-tubes from the mixer compartments 20. Therefore the valves 66 are opened from time to time to equalise static pressures.

We claim:

1. Apparatus for mixing liquid phases comprising means defining a mixing compartment for holding liquid phases of differing densities, a pair of pulse mix tubes one end of each extending into the compartment and open to the compartment to form a mouth portion, a pair of vertically disposed U-tubes partly filled with a liquid distinct from the liquid phases, one arm of each of the U-tubes being connected to one of the pair of pulse mix tubes, means operatively communicating through the U-tubes to alternately decrease and increase the pressure in each pulse mix tube at a phase opposite to but equal in amplitude to that in the other tube, the other arm of each of the pair of U-tubes being connected to said means for alternately decreasing and increasing the pressure.

2. Apparatus for mixing liquid phases comprising means defining a mixing compartment, a pair of pulse mix tubes one end of each extending downwardly into the compartment and open to the compartment to form a mouth portion, each pulse mix tube including a first vertically disposed U-tube for holding a liquid, one arm of the first U-tube communicating with the one end mouth portion of the respective pulse mix tube, the base of each of the first U-tubes being disposed at a level below the one end mouth portion of the pulse mix tube connected therewith, a pair of vertically disposed second U-tubes for holding a liquid, one arm of each of the second U-tubes being connected to the other arm of one of the first vertically disposed U-tubes, means operatively communicating with each of the pulse mix tubes through the U-tubes to alternately decrease and increase the pressure in each pulse mix tube at a phase opposite to but equal in amplitude to the pressure in the other pulse mix tube, the other arm of each of the second pair of U-tubes being connected to said means for alternately decreasing and increasing the pressure.

3. Apparatus for mixing liquid phases comprising means defining a mixing compartment, a pair of pulse mix tubes one end of each extending downwardly into the compartment and open to the compartment to form a mouth portion, each pulse mix tube including a chamber communicating with the one end mouth portion of the pulse mix tube and having a lower portion disposed at a level below said one end mouth portion of the respective pulse mix tube, a pair of vertically disposed U-tubes for holding a liquid, a pair of connecting tubes for the chambers, each of said connecting tubes extending from one arm of one of the U-tubes at a level above the point of communication of a chamber with its respective pulse mix tube and thence into said lower portion of the chamber, means to alternately decrease and increase the pressure in each pulse mix tube at a phase opposite to but equal in amplitude to the pressure in the other pulse mix tube, said means operatively communicating with each of the pulse mix tubes by connection to the other arm of each of the U-tubes.

References Cited in the file of this patent

UNITED STATES PATENTS

| | | |
|---|---|---|
| 246,406 | McMillan | Aug. 30, 1881 |
| 2,011,186 | Van Dijck | Aug. 13, 1935 |
| 2,682,452 | Wainwright | June 29, 1954 |
| 2,743,170 | Burger | Apr. 24, 1956 |
| 2,879,144 | Thornton | Mar. 24, 1959 |

OTHER REFERENCES

Thornton: "Nuclear Engineering," C.E.P. Symposium Series, pages 42–44.